United States Patent [19]
Karau et al.

[11] Patent Number: 4,481,925
[45] Date of Patent: Nov. 13, 1984

[54] INTERNAL COMBUSTION ENGINE SPARK TIMING CONTROL INCLUDING PEAK COMBUSTION SENSOR

[75] Inventors: Philip A. Karau, Anderson; Marshall W. Littrell, Fortville; John S. Brooks, Anderson, all of Ind.

[73] Assignee: General Motors Corporation, Detroit, Mich.

[21] Appl. No.: 506,209

[22] Filed: Jun. 20, 1983

[51] Int. Cl.³ .............................................. F02P 5/04
[52] U.S. Cl. .................................... 123/425; 123/435
[58] Field of Search ..................... 123/425, 435; 73/35

[56] References Cited

U.S. PATENT DOCUMENTS

| | | |
|---|---|---|
| 3,209,256 | 9/1965 | Slawsky . |
| 3,221,253 | 11/1965 | Keyes . |
| 3,328,705 | 6/1967 | Eubanks . |
| 3,379,983 | 4/1968 | Harris . |
| 3,412,330 | 11/1968 | Klaver . |
| 3,541,457 | 11/1970 | Leighty et al. . |
| 3,564,287 | 2/1971 | Todd . |
| 3,753,109 | 8/1973 | Schainbaum . |
| 3,815,026 | 6/1974 | Kraft et al. . |
| 3,822,399 | 7/1974 | Grund et al. . |
| 3,957,023 | 5/1976 | Peterson ............................ 123/425 |
| 3,973,197 | 8/1976 | Meyer . |
| 4,038,568 | 7/1977 | May et al. . |
| 4,053,799 | 10/1977 | Minami . |
| 4,054,111 | 10/1977 | Sand ................................... 123/425 |
| 4,063,538 | 12/1977 | Powell et al. ...................... 123/425 |
| 4,116,175 | 9/1978 | Sand ................................... 123/425 |
| 4,190,027 | 2/1980 | Inui et al. .......................... 123/425 |
| 4,356,551 | 10/1982 | Iwase et al. ..................... 123/425 X |
| 4,391,248 | 7/1983 | Latsch ............................... 123/425 |

Primary Examiner—Tony M. Argenbright
Attorney, Agent, or Firm—Robert M. Sigler

[57] ABSTRACT

An internal combustion engine with a spark timing control which varies spark timing to maintain a substantially constant peak combustion pressure timing includes a combustion pressure sensor generating a signal contaminated by high frequency noise and further apparatus which tracks the sensor signal only while it is increasing above a previous maximum and generates an output signal whenever it stops tracking to indicate the timing of a new maximum. Numbers representing the crankshaft rotational positions of the successive signals are stored in a storage element during a crankshaft rotational range in which peak combustion pressure is expected. At the end of the range, the last stored number is used to represent the timing of peak combustion pressure in the spark timing control and the apparatus reset for the next determination.

1 Claim, 3 Drawing Figures

INTERNAL COMBUSTION ENGINE SPARK TIMING CONTROL INCLUDING PEAK COMBUSTION SENSOR

BACKGROUND OF THE INVENTION

This invention relates to combustion control apparatus for an internal combustion engine and particularly to such apparatus which includes means effective to control a combustion related engine parameter on the basis of the timing of peak combustion chamber pressure. Such systems in the past have generally used a differentiator and zero crossing detector circuit to determine the derivative of the combustion pressure wave form and generate a signal at the moment of peak pressure, as determined by the zero crossing of the derivative signal.

The detection of the true peak by this method is difficult, however, since the pressure signal wave form is generally contaminated with noise at a higher frequency which generates a multitude of peaks which hide the true peak. The prior art apparatus has therefore included filtering of various kinds in order to smooth the pressure wave form signal or its derivative sufficiently for detection of the timing of the actual peak pressure. However, in addition to the expense of these filters and the difficulty of accomplishing the filtering task in an effective manner, such filters generally introduce phase shifts to the pressure signal wave form which cause a shift in the apparent timing of the peak pressure.

SUMMARY OF THE INVENTION

Therefore, it is an object of this invention to provide apparatus for the detection of the timing of peak combustion pressure in an internal combustion engine in a manner which does not significantly shift the phase of the cylinder pressure signal wave form. This object is obtained in apparatus including means effective to generate an electrical voltage signal representative of the pressure in the combustion chamber, first storage means effective to track the voltage signal while the signal increases above any previous maximum and hold the maximum value thereof while the signal decreases in value, means effective to sense the rotational position of the crankshaft at each instant at which the first storage means stops tracking the voltage signal, second storage means effective when actuated to store sequentially each successive value of the rotational position of the crankshaft as sensed by the crankshaft rotational position sensing means, means effective to actuate the second storage means for a predetermined crankshaft rotational position range in which peak combustion chamber pressure is expected and reset the first storage means at the beginning of said range to a predetermined value sufficiently low as to allow peak combustion pressure to be detected and means effective to compare the value stored in the second storage means at the end of the predetermined crankshaft rotational position range with a predetermined reference and adjust a combustion-affecting engine operating parameter in direction to reduce any significant difference between said value and said predetermined reference.

This apparatus, activated only during a predetermined crankshaft rotational range, receives the basically unfiltered signal from combustion pressure sensing means and stores the timing of each successive peak of that signal which is higher than a previous peak. At the end of the crankshaft rotational position range, the timing value which remains represents the crankshaft angle of the highest peak recorded during the period and therefore of the actual peak combustion pressure. The apparatus which tracks the repeated peak is reset to a low value at the beginning of each said crankshaft rotational range. Thus, the location of the actual peak combustion pressure is determined without the use of extensive filtering which might shift the phase and therefore the apparent timing of said peak. Further details and advantages of this invention will be apparent from the accompanying drawings and following description of the preferred embodiment.

DESCRIPTION OF THE PREFERRED EMBODIMENT

Figure 1:
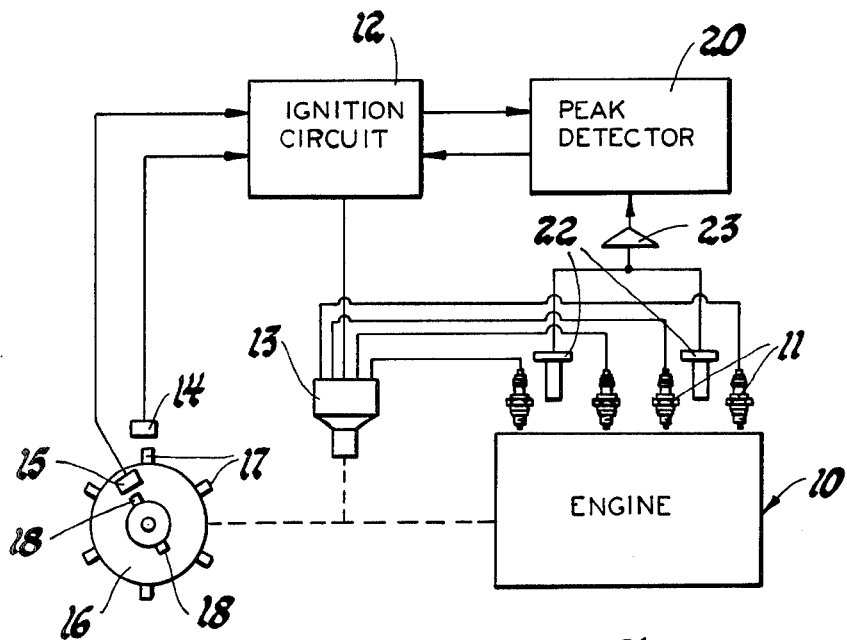
FIG. 1 shows a schematic and block diagram of an engine according to this invention in which the location of peak combustion pressure is used to determine spark timing.

Referring to FIG. 1, an internal combustion engine 10 includes a plurality of combustion chambers, not shown, in which combustible charges are ignited by means of spark plugs 11 to generate power through the expansion of gases against pistons and cause rotation of an engine crankshaft, not shown, in the normal manner of such engines. An ignition circuit 12 generates spark firing pulses which are routed to the proper spark plugs 11 through a distributor 13 or similar apparatus as is common in the prior art. Ignition circuit 12 may, for example, comprise a programmed digital computer which receives input timing pulses from a magnetic pickup 14 and synch pulses from a magnetic pickup 15. Pickups 14 and 15 are associated with a double toothed wheel 16 having a plurality of timing pulse generating teeth 17 and synch pulse generating teeth 18 associated with respective pickups 14 and 15 to generate the pulses therein. This pulse generating apparatus and its operation will be described in greater detail at a later point in the specification. From these pulses, however, ignition circuit 12 determines a reference crankshaft position for the firing of each spark plug 11 in proper succession.

Ignition circuit 12 may further receive a signal from a peak detector 20 and determine from said signal the actual crankshaft related rotational location of peak pressure for the last fired spark plug or, if separate spark timing is maintained for each spark plug, for the last firing of the next spark plug to be fired. Comparison of this location or timing with a predetermined desired timing generates an error signal which may be combined with a constant reference crankshaft angle to determine the actual timing of the next spark firing with reference to one of the timing pulses from magnetic pickup 14. Ignition circuit 12 further causes a spark pulse to be generated at the crankshaft angle as so determined and also includes circuitry effective to generate the high voltage pulse necessary to fire the spark plug 11. Apparatus suitable for use as ignition circuit 12 may be found in the U.S. Pat. No. 4,231,091 issued Oct. 28, 1980 to Phillip R. Motz.

Peak detector 20 receives a signal from one or more combustion chamber pressure sensors 22, which may be of any known type of pressure sensor sensitive to combustion pressure but may particularly be of the type comprising a head bolt for engine 10 in conjunction with a quartz force ring compressed thereunder or of the type in which the head bolt itself includes a piezoelectric element affixed to the bolt head for flexure therewith. In the case of a head bolt sensor, two sensors may suffice for the timing of a four-cylinder engine. The signals from sensors 22 are combined and amplified in an amplifier 23 and provided to an input of peak detector 20.

Figure 2:
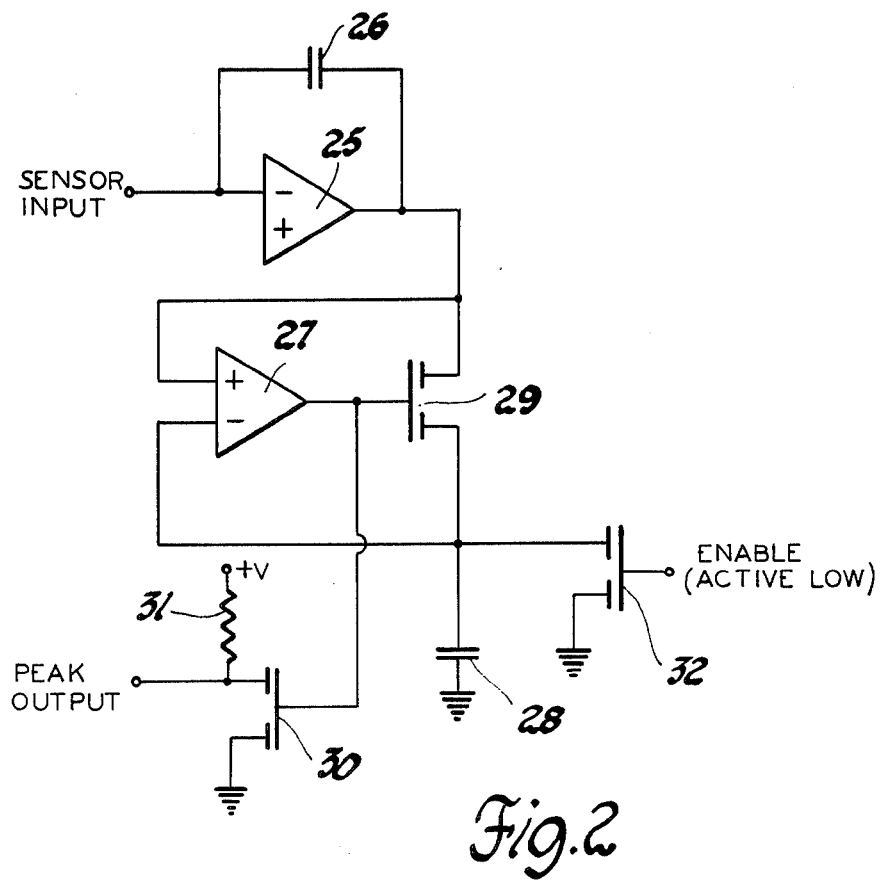
FIG. 2 is a circuit diagram of a portion of the circuitry in the peak detector of the apparatus in FIG. 1.

The circuitry of peak detector 20 is shown in FIG. 2. The sensor input is provided to the inverting input of an op amp 25 of the type having FET inputs. Op amp 25 is provided with a capacitor 26 in negative feedback to serve as a buffer amplifier for the incoming signal. The output of the op amp 25 is provided to the non-inverting input of a comparator 27 of the type having FET inputs. The inverting input of comparator 27 is connected to one side of a capacitor 28, the other side of which is grounded. The ungrounded side of capacitor 28 is further connected to the drain of a FET 29 having a gate connected to the output of comparator 27 and a source connected to the output of op amp 25. FET 29 serves as a gate to allow the charging of capacitor 28 by op amp 25 when conducting and to prevent such charging when not conducting. The gate is controlled by comparator 27 so as to be conducting when the voltage output of op amp 25 exceeds the voltage across capacitor 28 and to be nonconducting when the voltage across capacitor 28 exceeds the voltage output of op amp 25. Thus, as the input from sensor 22 increases above the previous voltage across capacitor 28, comparator 27 causes gate 29 to conduct so that the voltage across capacitor 28 tracks the increasing voltage output of the sensor. As soon as the voltage output of sensor 22 peaks and begins to decrease, comparator 27 closes gate 29 so that capacitor 28 retains its peak voltage. Gate 29 will not become conducting again until the output of op amp 25 exceeds in voltage the voltage stored on capacitor 28.

The output of comparator 27 is connected to the gate of a FET 30 having a grounded source and a drain connected through a resistor 31 to a positive supply voltage +V. The conducting state of FET 30 thus follows the conducting state of FET 29, but controls a circuit isolated therefrom so that it does not affect the charge or voltage on capacitor 28. The drain of FET 30 provides a peak output signal which indicates the timing of a peak in combustion pressure whenever it exhibits a downward edge or step. This peak output signal is provided to the ignition circuit 12.

Finally, the ungrounded side of capacitor 28 is connected to the drain of a FET 32 having a grounded source and a gate which receives an enable signal from ignition circuit 12. This enable signal is active low and occurs only during a predetermined crankshaft rotational range such as, for example, zero to 60° after top dead center, in which the peak combustion pressure is expected. Naturally, the exact range is a design criteria which may vary according to the peculiarities of the different types of engines to which this apparatus may be applied and other design criteria. While this enable signal is active low, capacitor 28 is allowed to charge under the control of FET 29. However, when this signal goes inactive high, FET 32 is caused to conduct and discharges capacitor 28 to ground so as to reset it for the next peak pressure detection.

Thus, in the operation of the circuit of FIG. 2, the circuit begins with FET 32 in a conducting state just before top dead center and capacitor 28 discharged. At top dead center, FET 32 is made nonconducting and capacitor 28 is allowed to charge up with each successive rising wave form from the sensor input which exceeds any previous voltage on capacitor 28. The output of comparator 27 will switch alternately high and low as its non-inverting input follows the sensor input wave form; and a series of output signals will be generated by FET 30. When the true peak combustion pressure has occurred, comparator 27 will thereafter maintain a low output; and there will be no more peak output signals from the circuit of FIG. 2. Eventually the enable signal once again goes high at 60° after top dead center, thus discharging capacitor 28. Additional circuitry may be included to suppress spurious signals generated by FET 30 while capacitor 28 is grounded; or ignition circuit 12 may be programmed to ignore any input from peak detector 20 except when the enable signal is active low.

Figure 3:
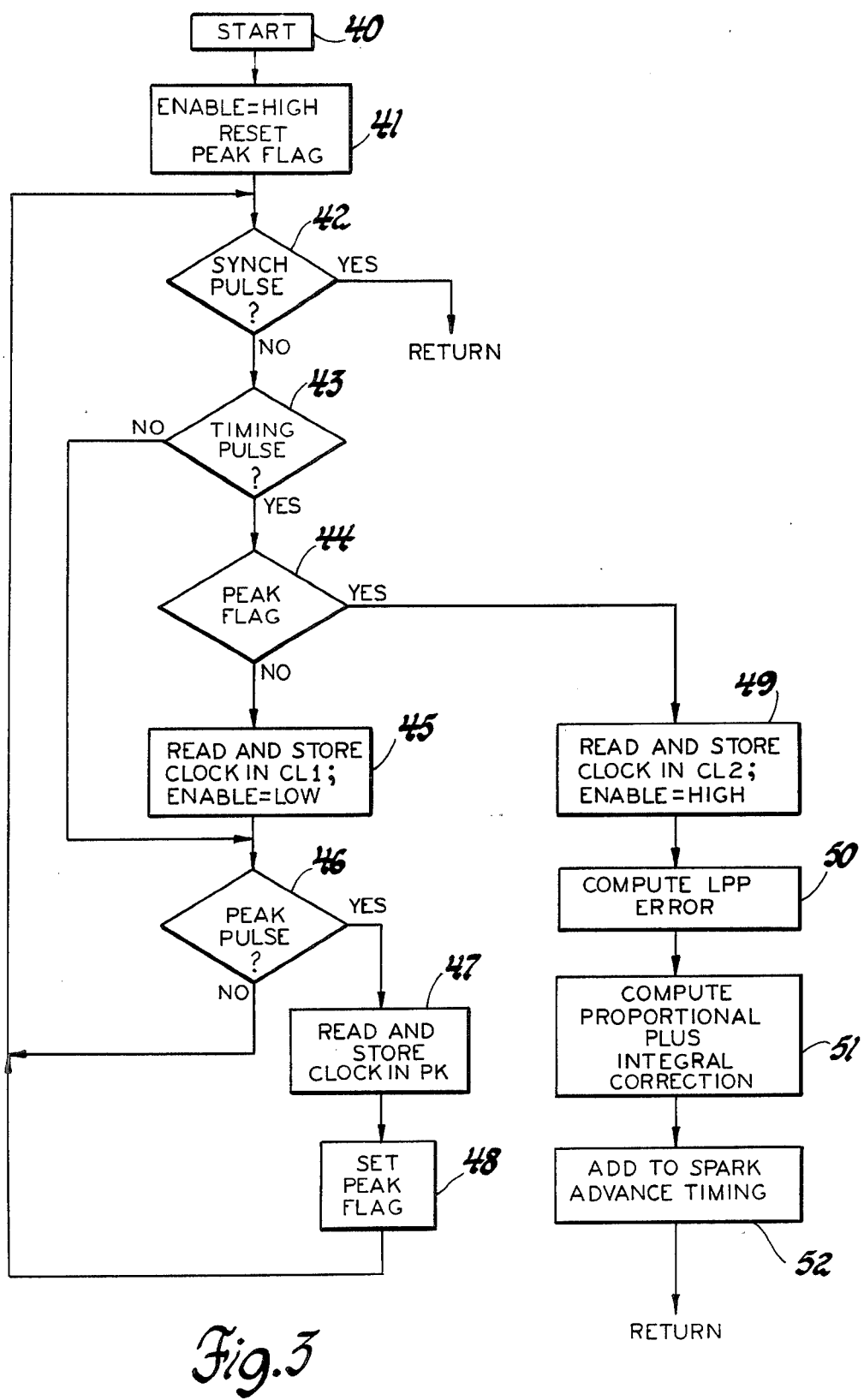
FIG. 3 is a computer flow chart describing the operation of the ignition circuit 12 of FIG. 1 with respect to this invention.

The input to ignition circuit 12 from peak detector 20 is thus a series of pulses, the trailing edges of which occur at the times of peaks as detected by peak detector 20 and the last trailing edge of which is the time of the true peak combustion pressure. Ignition circuit 12 cannot predict in advance when each trailing edge will occur or which will be the last and it must therefore associate each such trailing edge with a number representing the actual crankshaft angle timing of the trailing edge and store the number at least until the next such trailing edge is received. Assuming that ignition circuit 12 includes a programmed digital computer, FIG. 3 shows a flow chart of a portion of the program which relates to peak detector 20. However, before describing this flow chart, the pulses from the double toothed wheel 16 and magnetic pickups 14 and 15 will be described in greater detail.

The engine shown in FIG. 1 is, in this embodiment, a four-cylinder engine in which the crankshaft makes one complete revolution for each two cylinders or combustion chambers. Double toothed wheel 16 is provided with six equally spaced teeth 17 associated with magnetic pickup 14. Thus, the crank angle between two successive teeth 17 is 60°; and every third tooth 17 is associated with a predetermined crank angle at top dead center for a particular cylinder or combustion chamber of engine 10. However, from teeth 17 alone, the proper synchronization of teeth 17 with absolute crankshaft position cannot be determined. Therefore, a second set of two teeth 18 are provided 180° apart and associated with magnetic pickup 15. These teeth generate synchronizing pulses just before the reference teeth 17 associated with top dead center pass magnetic pickup 14 and generate timing pulses. Thus, every third timing pulse from magnetic pickup 14 is uniquely identified by a preceding synch pulse from magnetic pickup 15 and the proper synchronization of timing pulses with absolute crankshaft position is obtained.

The computer included in ignition circuit 12 maintains a real time clock which generates a high resolution clock signal at a constant time rate. For purposes of this system it will be assumed that at all operating speeds of engine 10, engine speed is constant within the accuracy requirements of the system between two consecutive teeth 17 at a crank angle of 60°. If it were determined that this were not so, a greater number of teeth 17, spaced a smaller crank angle apart, would be used; the actual number of teeth 17 is not important to the invention. In fact, the toothed engine flywheel, with a much larger number of teeth spaced only a few degrees apart, could easily be used in place of the double toothed wheel 16, with suitable modifications to the flow chart, as long as the proper synch pulses were provided.

The general goal of the flow chart shown in FIG. 3 is to store a real clock time for a first timing pulse in a first register, the real clock time of a detected peak in a second register and the real clock time of the next succeeding timing pulse in a third register. By means of a simple algorithm the actual crankshaft angle of the detected peak may be determined. Synch pulses from pickup 15 are detected to coordinate the system with actual crankshaft rotational position; and the enable signal for circuit 2 is stepped at the proper crankshaft rotational position.

In detail, the flow chart of FIG. 3 starts at 40 and proceeds to set the enable signal inactive high and reset a peak flag at 41. At 42, the program determines whether a synch pulse has been received. This can be accomplished by having each input synch pulse set a bit or flag in a control register, which register may be monitored by the program. A similar technique may be used to keep track of timing pulses. The program is run at a repetition rate sufficiently fast to detect the synch and timing pulses virtually as soon as they occur, within the required accuracy of the system.

If synch pulse has occurred, the program returns to the start 40 for a reset. If it has not occurred, the program next determines at 43 if a timing pulse has occurred. If a timing pulse has occurred, the program next determines if the peak flag is set at 44. If the peak flag has not been set, the program reads and stores the real time clock value in a register CL1 and sets the enable signal active low at 45. The program has now stored the time of the first timing pulse in register CL1.

The program next determines at 46 if a peak pulse has occurred. If the answer is no, the program returns to decision point 42 for another look at the various flags. At decision point 43, if the program determines that a timing pulse has not occurred, the program proceeds directly to decision point 46 to look for a peak pulse. If a peak pulse is detected at decision point 46, the program reads and stores the real time clock value in register PK at 47 and sets the peak flag at 48 before returning to decision point 42.

Thus, when a synch pulse is detected, the system is reset with register PK equal to zero and the peak flag reset. The system first looks for a timing pulse and, when it detects one, stores the real time clock value of the timing pulse in CL1. The next pulse detected will be a peak pulse; and when this is detected the real time clock value of the peak pulse is stored in register PK and the peak flag set. When the next timing pulse is detected, with the peak flag set, the program has all the information it needs to determine the location of peak pressure and it thus proceeds from decision point 44 to read and store the real time clock value of the timing pulse in register CL2 and set the enable signal inactive high at 49. The LPP error is next computed in the following manner. First, at 50, the location of peak combustion pressure is determined according to the equation: $LPP = (PK-CL1)/(CL2-CL1) \times 60° + REF$, where PK, CL1 and CL2 are the real time numbers stored in the registers of the same name and REF is the predetermined, constant crankshaft angle with reference to a timing pulse. This value of LPP is then compared with a desired LPP value. The program next, at 51, takes the signed difference of the actual and desired LPP values and computes a proportional plus integral correction factor ERR, which may be added to the spark advance timing number at 52 before the program returns to the start. The normal spark timing programming as shown in the prior art then causes the actuation of the proper spark plug 11 at the proper time as determined by this spark advance timing value.

The embodiments of the invention in which an exclusive property or privilege is claimed are defined as follows:

1. An internal combustion engine having a rotating crankshaft, a combustion chamber and means to initiate combustion in said combustion chamber, said engine comprising, in combination:

means effective to sense the consecutive pressure peaks in the combustion chamber and generate a continuous voltage analog signal thereof, said signal being subject to noise oscillations at a frequency higher than that of the consecutive pressure peaks, said oscillations producing a plurality of minor peaks from which the actual peak combustion pressure must be distinguished;

first storage means effective to track said voltage analog signal while said signal is increasing above any previous maximum and hold the maximum value thereof while said signal decreases;

means effective to sense the rotational position of the crankshaft at each instant at which the first storage means stops tracking the voltage analog signal; whereby the location of each peak higher than the last is detected;

second storage means effective when actuated to store sequentially numbers representing each successive value of the rotational position of the crankshaft as sensed by said last means;

means effective to actuate said second storage means for a predetermined crankshaft rotational position range in which peak combustion chamber pressure is expected and reset said first storage means at the beginning of said predetermined crankshaft position range to a predetermined value sufficiently low as to allow peak combustion pressure to be detected; and means effective to compare the value stored in the second storage means at the end of the predetermined crankshaft rotational position range with a predetermined reference and adjust a combustion affecting engine operating parameter in direction to reduce any significant difference between said value and said predetermined reference, whereby combustion is controlled to produce peak combustion chamber pressure at a predetermined crankshaft rotational position in closed loop control by sensing the location of peak combustion chamber pressure in the presence of high frequency noise peaks.

* * * * *